(12) United States Patent
Kraemer et al.

(10) Patent No.: US 11,858,472 B2
(45) Date of Patent: Jan. 2, 2024

(54) ADAPTER UNIT

(71) Applicant: Robert Bosch GmbH, Stuttgart (DE)

(72) Inventors: Godelieve Kraemer, Huegelsheim (DE); Marcello Bubba, Linden (BE); Herve Bratec, Sint-Lambrechts-Herk (BE); Michael Kruse, Sinzheim (DE); Helmut Depondt, Boutersem (BE); Stijn Truyens, Tienen (BE)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 17/264,920

(22) PCT Filed: Jun. 6, 2019

(86) PCT No.: PCT/EP2019/064801
§ 371 (c)(1),
(2) Date: Feb. 1, 2021

(87) PCT Pub. No.: WO2020/025197
PCT Pub. Date: Feb. 6, 2020

(65) Prior Publication Data
US 2021/0309185 A1 Oct. 7, 2021

(30) Foreign Application Priority Data
Jul. 30, 2018 (DE) .................. 10 2018 212 666.6

(51) Int. Cl.
*B60S 1/04* (2006.01)
*B60S 1/38* (2006.01)
*B60S 1/40* (2006.01)

(52) U.S. Cl.
CPC ........... *B60S 1/0408* (2013.01); *B60S 1/3863* (2013.01); *B60S 1/40* (2013.01); *B60S 1/4083* (2013.01); *B60S 1/4087* (2013.01); *B60S 1/3853* (2013.01)

(58) Field of Classification Search
CPC .... B60S 1/0408; B60S 1/3806; B60S 1/3863; B60S 1/381; B60S 1/4083; B60S 1/4087; B60S 1/4009; B60S 1/4045; B60S 1/3853
(Continued)

(56) References Cited

FOREIGN PATENT DOCUMENTS

DE 102013220255 A1 4/2015
DE 102016204243 * 9/2017
(Continued)

OTHER PUBLICATIONS

Machine language translation of description portion of German publication 102016204243, published Sep. 2017. (Year: 2017).*
(Continued)

*Primary Examiner* — Gary K. Graham
(74) *Attorney, Agent, or Firm* — Michael Best & Friedrich LLP

(57) ABSTRACT

The invention relates to an adapter unit which is provided for coupling, in particular releasably coupling, a wiper blade to a wiper arm, having a wind deflecting surface which is designed to deflect inflowing air and press the wiper blade against a vehicle pane, wherein the wind deflecting surface is bordered by a wind deflecting surface edge, and the wind deflecting surface edge has at least •a side which faces the wind and which extends largely in a wiper arm direction, •a side which faces away from the wind and which extends largely in the wiper arm direction, a right-hand side which is arranged between the side facing the wind and the side facing away from the wind and which is arranged on the wiper arm side of the adapter and is designed to couple the adapter unit to the wiper arm, •a rear left-hand side which adjoins the side facing away from the wind and is arranged on the adapter side opposite the wiper arm side, and •a front left-hand side which adjoins the side facing the wind and is arranged on the adapter side lying opposite the wiper arm
(Continued)

side. According to the invention, the side facing away from the wind and the right-hand side define a rear angle ranging between 110° and 160°, preferably between 120° and 150°, particularly preferably between 130° and 140°.

24 Claims, 4 Drawing Sheets

(58) Field of Classification Search
USPC .......................................... 15/250.201, 250.32
See application file for complete search history.

(56) References Cited

FOREIGN PATENT DOCUMENTS

| | | |
|---|---|---|
| DE | 102016211162 A1 | 12/2017 |
| FR | 3044618 A1 | 6/2017 |
| FR | 3049916 * | 10/2017 |

OTHER PUBLICATIONS

Machine language translation of description portion of German publication 102013220255, published Apr. 2015. (Year: 2015).*
Translation of International Search Report for Application No. PCT/EP2019/064801 dated Aug. 26, 2019 (2 pages).

* cited by examiner

ADAPTER UNIT

BACKGROUND OF THE INVENTION

The invention relates to an adapter unit which is provided for coupling, in particular releasably coupling, a wiper blade to a wiper arm, having a wind deflector face which is configured for deflecting an incident flow of air and for pressing the wiper blade onto a vehicle glass.

Wiper devices comprising a wiper arm and a wiper blade as well as an adapter unit for releasably coupling a wiper arm to a wiper blade have already been proposed. Such wiper devices have the disadvantage that the wiper arm at all times has to apply a high contact pressing force for pressing the wiper blade onto a vehicle glass in order for a sufficient wiper performance to be guaranteed.

SUMMARY OF THE INVENTION

The present invention describes an adapter unit which is provided for coupling, in particular releasably coupling, a wiper blade to a wiper arm, having a wind deflector face which is configured for deflecting an incident flow of air and for pressing the wiper blade onto a vehicle glass, wherein the wind deflector face is bordered by a wind deflector face periphery, and the wind deflector face periphery has at least
- a side facing the wind—which extends largely in a wiper arm direction—and
- a side facing away from the wind—which extends largely in the wiper arm direction—and
- a right side—which is disposed between the side facing the wind and the side facing away from the wind and is disposed on that wiper arm side of the adapter on which it is provided that the adapter unit is coupled to the wiper arm—and
- a rear left side—which is adjacent to the side facing away from the wind and is disposed on that side of the adapter that is opposite the wiper arm side—and
- a front left side—which is adjacent to the side facing the wind and is disposed on that side of the adapter that is opposite the wiper arm side, characterized in that the side facing away from the wind and the right side define a rear angle between 110° and 160°, preferably between 120° and 150°, particularly preferably between 130° and 140°.

This has the advantage that, by virtue of the incident flow of headwind on the wind deflector face when driving fast, said wind deflector face presses the wiper blade onto the vehicle glass. This increases an overall contact pressing force of the wiper blade on the vehicle glass and improves the wiper performance. In this way, the required contact pressing force by way of which the wiper arm presses the wiper blade onto the vehicle glass is reduced. A wiper arm which is more cost-effective and/or simpler and/or more reliable and/or more compact and has a lower contact pressing force can be used, in particular with a smaller spring for applying the contact pressing force. It is furthermore prevented by using a wind deflector face according to the present invention that the adapter unit, or a wiper device, respectively, —comprising the adapter unit, the wiper blade, and the wiper arm—on account of unfavorable aerodynamics when driving fast generates a force which is counter to the required contact pressing force and thus would impede the wiper performance or would even make wiping impossible. It is ensured on account of the adapter unit according to the present invention that a resulting force by virtue of aerodynamic effects, in particular wind, in particular headwind, presses the wiper blade onto the vehicle glass. On account of the first sub-face and the second sub-face having in each case a different geometry and/or a different orientation, a precise setting of contact pressing forces, in particular an orientation of the contact pressing forces, is possible.

The wind deflector face periphery advantageously runs along an external circumference of the wind deflector face. The wind deflector face periphery is in particular a delimitation of the wind deflector face. The rear left side is advantageously adjacent to the front left side.

The adapter unit can be configured so as to be integral to the wind deflector face. Integral in this context is in particular to be understood as being connected in a materially integral manner such as, for example, by a welding process and/or an adhesive-bonding process, etc., and particularly advantageously as being molded thereon such as on account of the production from one casting and/or on account of the production in a single-component or multi-component injection-molding method.

The adapter unit advantageously has a wiper arm coupling element which is provided for being coupled directly or indirectly to the wiper arm. The adapter unit is advantageously configured so as to be integral to the wiper arm coupling element.

The adapter unit advantageously has a wiper blade coupling element which is provided for being coupled directly or indirectly to the wiper blade. The adapter unit is advantageously configured so as to be integral to the wiper blade coupling element.

It is particularly advantageous for the wind deflector face and a direction of an incident wind flow to enclose a main angle between 25° and 75°, preferably between 40° and 60°. In this way, positive aerodynamic properties of the adapter unit are enabled in association with a sufficiently large installation space of the adapter unit, in particular for accommodating the wiper arm coupling element.

A main angle is understood to be the angle at which the wind deflector face is in relation to the direction of an incident wind flow. The main angle is advantageously measured about the wiper arm direction. A positive main angle between 0° and 90° herein describes a wind deflector face which at least in part faces the direction of an incident wind flow. The closer the main angle is to 90°, the more the wind deflector face faces the direction of an incident wind flow. A direction of an incident wind flow is to be understood to be the direction in which the headwind in a non-wiping resting state of the adapter unit attached to the vehicle glass[[,]] or a wiper device wiper device, respectively—comprising the adapter unit, the wiper blade, and the wiper arm—would form an incident flow.

A wiper arm direction is to be understood to be a direction which is disposed in the direction of the largest longitudinal extent of the wiper arm assembled on the adapter unit, in particular in a neutral position. The wiper arm direction in the non-assembled state is the direction on the adapter unit in which an assembled wiper arm would point, in particular in a neutral position.

The main angle is advantageously defined between the direction of an incident wind flow and a projection of the direction of an incident wind flow onto the wind deflector face, wherein the projection is advantageously carried out along a projection plane in which the direction of an incident wind flow lies and which is disposed so as to be perpendicular or largely perpendicular to the wiper arm direction. It is also possible for the projection plane to be defined by the direction of an incident wind flow and a normal vector, or a mean normal vector of the wind deflector face, respectively. In the case of a curved or non-planar, respectively, wind deflector face it is conceivable that the main angle is defined between the direction of an incident wind flow and a tangential plane, wherein the tangential plane lies in a specified point—for example the center—of the wind deflector face, or is the tangential plane of a mean normal vector of the wind deflector face. A mean normal vector is understood to be a vector which represents the mean across all or almost all normal vectors of the wind deflector face.

The side facing the wind is in particular a side of the wind deflector face, in particular a portion of the wind deflector face periphery, which in a non-wiping resting state of the wiper device attached to the vehicle glass—the wiper device comprising the wiper arm adapter unit, the wiper blade, and the wiper arm—is disposed closest to the direction of an incident wind flow such that the headwind first flows past the side of the wind deflector face that faces the wind, or impacts the latter, respectively. The wind deflector face is preferably configured such that the side facing the wind in a non-wiping resting state of the wiper device attached to the vehicle glass is at least in regions disposed so as to be perpendicular or largely perpendicular to the direction of an incident wind flow.

The side facing away from the wind is in particular to be understood to be a side of the wind deflector face, in particular a portion of the wind deflector face periphery, which in a non-wiping resting state of the wiper device attached to the vehicle glass—the wiper device comprising the wiper arm adapter unit, the wiper blade, and the wiper arm—is disposed so as to be most remote from the direction of an incident wind flow, such that the headwind last flows past the side of the wind deflector face that faces away from the wind, or impacts the latter, respectively. The wind deflector face is preferably configured such that the side facing away from the wind in a non-wiping resting state of the wiper device attached to the vehicle glass is at least in regions disposed so as to be perpendicular or largely perpendicular to the direction of an incident wind flow.

Advantageous refinements of the adapter unit are possible on account of the features set forth in the dependent claims.

Aerodynamics of the adapter unit are further improved when the rear left side and the front left side define a left-hand angle between 80° and 130°, preferably between 90° and 120°, particularly preferably between 100° and 110°.

The adapter unit has a particularly laminar flow of headwind when the side facing the wind in relation to the side facing away from the wind is disposed at a front right-hand angle between 0.0° and 20.0°, preferably between 2.5° and 15.0°, particularly preferably between 5.0° and 10.0°. Undesirable vibrations of the adapter unit are minimized in this way.

A further improvement arises when the front left side in relation to the side facing away from the wind is disposed at a front left-hand angle between 10° and 60°, preferably between 20° and 50°, particularly preferably between 30° and 40°.

The aerodynamics of the adapter unit are further improved when the front left side in relation to the right side is disposed at an internal angle between 0° and 50°, preferably between 10° and 40°, particularly preferably between 20° and 30°.

When the wind deflector face has a rectangular pushbutton which is configured for releasably coupling the wiper arm to the adapter unit, wherein two opposite lateral edges of a button contour of the button are oriented so as to be parallel or largely parallel to the right side, this has the advantage that the button is shaped in a particularly aerodynamic manner. Turbulences caused by the button are minimized in this way.

Largely parallel is to be understood to mean that a first axis and a second axis enclose an angle which does not deviate from 0° by more than 8°, advantageously not more than 5°, particularly advantageously not more than 2°. Largely perpendicular is to be understood to mean that a first axis and a second axis enclose an angle which does not deviate from 90° by more than 8°, advantageously not more than 5°, particularly advantageously not more than 2°.

The wind deflector face is advantageously configured so as to be integral to the button.

It is advantageous for the wind deflector face to have a button which is configured for releasably coupling the wiper arm to the adapter unit, wherein the button is configured as a latching button which is disposed in a button opening, wherein the latching button is configured such that the latching button is disposed so as to be centric or largely centric in the button opening when the wiper arm is latched, and that the latching button bears on an upper edge of the button opening when the wiper arm is not latched.

When the wind deflector face has a button which is configured for releasably coupling the wiper arm to the adapter unit, wherein the button is configured as a spring button having a spring for applying a restoring force, wherein the spring has an arcuate piece having at least one rib, preferably three ribs, wherein the at least one rib is oriented so as to be parallel or largely parallel to a radius of the arcuate piece, and is provided for reinforcing the arcuate piece, this has the advantage that a desired degree of stiffness of the arcuate piece can be precisely set with the aid of the ribs. Ease of operation of the adapter unit can be enhanced in this way. The spring, or the arcuate piece, respectively, is in particular configured for applying an elastic restoring force such that the button, after being depressed and released, moves back to an initial position again. The wind deflector face is advantageously configured so as to be integral to the spring and/or to the at least one rib. The button is advantageously configured so as to be integral to the at least one rib. The spring and/or the arcuate piece are/is advantageously configured so as to be integral to the at least one rib.

When the adapter unit is configured for connecting the wiper arm to the wiper blade so as to be pivotable about a mounting axisaxis, this has the advantage that an optimal contact pressing force can be largely guaranteed across an entire wiping region on the vehicle glass, in particular in the case of curved vehicle glasses.

The adapter unit is advantageously configured such that the mounting axis is disposed so as to be parallel or largely parallel to the direction of an incident wind flow. The adapter unit is advantageously configured such that the mounting axis is disposed so as to be perpendicular or largely perpendicular to a wiper arm direction. The mounting axis is advantageously disposed so as to be parallel or largely parallel to an envisaged wiping direction. The mounting axis is advantageously disposed such that said mounting axis in a non-wiping resting state of the wiper device attached to the vehicle glass—the wiper device comprising the wiper arm adapter unit, the wiper blade, and the wiper arm—is disposed so as to be parallel or largely parallel to a direction of an incident wind flow, or to a travel direction of the vehicle, respectively. The mounting axis in a state assembled on the vehicle particularly advantageously lies so as to be parallel to the vehicle glass, preferably at each position across one wiping movement.

Particularly advantageous is an adapter unit comprising a wiper arm adapter unit and a wiper blade adapter unit, wherein the wiper arm adapter unit is provided for coupling to the wiper arm, and the wiper blade adapter unit is provided for receiving the wiper blade, wherein the wiper arm adapter unit has a wiper blade adapter unit receptacle which is provided for receiving the wiper blade adapter unit so as to be pivotable about the mounting axis. Particularly favorable aerodynamics of a connection region between the adapter unit and the wiper arm can in this way be guaranteed at any point in time of a wiping movement.

The wiper arm adapter unit is advantageously configured so as to be integral to the wind deflector face and/or to the wiper blade adapter unit receptacle. The wiper arm adapter unit is advantageously fixedly connectable to the wiper arm, in particular such that the wiper arm in the state connected to the wiper arm adapter unit is largely immovable in relation to the wiper arm adapter unit.

A wiper blade adapter unit is in particular to be understood to be an adapter which has a contact region toward the wiper blade, or toward a wiper blade component, respectively, and is connectable, advantageously fixedly connectable, to the wiper blade, or the wiper blade component, respectively, in particular connectable such that the wiper blade in a state connected to the wiper blade adapter unit is largely immovable in relation to the wiper blade adapter unit. The wiper blade adapter unit advantageously has a connection element which is provided for pivotably coupling to the wiper blade adapter unit receptacle of the wiper arm adapter unit. The wiper blade adapter unit is advantageously configured so as to be integral to the contact region and/or to the connection element. It is also conceivable for the wiper blade adapter unit to be configured so as to be integral to the wiper blade or to a wiper blade component. The wiper blade adapter unit receptacle is advantageously configured such that the mounting axis is disposed so as to be perpendicular or largely perpendicular to a wiper arm direction.

Particularly advantageous is an adapter unit, comprising a base element, a cover element, and a wiper arm receptacle which is provided for receiving the wiper arm so as to be pivotable about the mounting axis, wherein the cover element is configured so as to be connectable to the base element and largely covers the wiper arm receptacle, and wherein the cover element has the wind deflector face, and wherein the base element is configured for receiving the wiper blade, and wherein the cover element is in particular configured so as to be fixedly connectable to the base element such that the cover element connected to the base element is largely immovable in relation to the base element. Particularly favorable aerodynamics of a connection region between the adapter unit and the wiper blade can in this way be guaranteed at any point in time of a wiping movement.

The cover element is advantageously configured so as to be integral to the wind deflector face. The cover element advantageously has a coupling element which is provided for connecting to the base element. The cover element is advantageously configured so as to be integral to the coupling element. A base element is in particular to be understood to be an adapter which has a contact region toward the wiper blade, or to a wiper blade component, respectively, and is connectable, advantageously fixedly connectable, to the wiper blade or the wiper blade component, respectively, in particular connectable such that the wiper blade in the state connected to the base element is largely immovable in relation to the base element. The base element advantageously has a receptacle element which is provided for coupling to the cover element, or to the coupling element of the cover element, respectively. The wiper blade adapter unit is advantageously configured so as to be integral to the contact region and/or to the connection element. It is also conceivable for the base element to be configured so as to be integral to the wiper blade or to a wiper blade component. The base element advantageously has the wiper arm receptacle. The base element is advantageously configured so as to be integral to the wiper arm receptacle. The wiper arm receptacle is advantageously configured such that the mounting axis is disposed so as to be perpendicular or largely perpendicular to a wiper arm direction.

BRIEF DESCRIPTION OF THE DRAWINGS

Exemplary embodiments of the adapter unit according to the present invention are illustrated in the drawings and explained in more detail in the description hereunder. In the drawings.

DETAILED DESCRIPTION

Identical parts are provided with the same reference signs in the different variants of embodiment.

Figure 1:
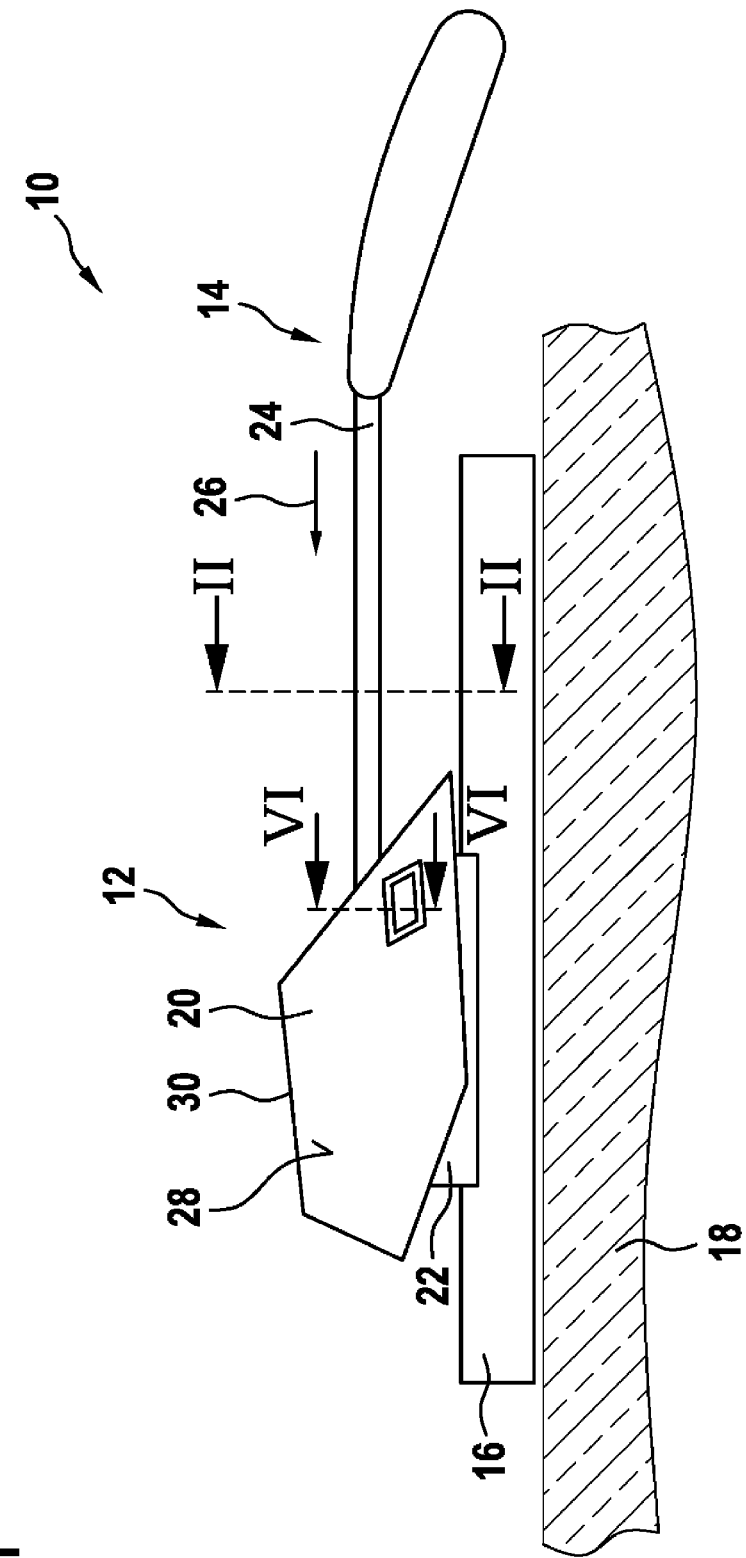
FIG. 1 shows a wiper device having an adapter unit.

A wiper device 10 having an adapter unit 12, a wiper arm 14, and a wiper blade 16 is schematically shown in a lateral view in FIG. 1. The wiper blade 16 is configured as a flat wiper blade. The wiper blade 16 is provided for cleaning a vehicle glass 18. The adapter unit 12 has a cover element 20. The adapter unit has a base element 22. The wiper arm 16 has a wiper rod 24. In the exemplary embodiment, a direction of main longitudinal extent of the wiper arm adapter unit is disposed so as to be parallel to a wiper arm direction 26. A direction of main longitudinal extent of the wiper blade is disposed so as to be parallel to the wiper arm direction. In advantageous variants, the direction of main longitudinal extent of the wiper arm adapter unit is disposed so as to be at least largely parallel to a wiper arm direction 26. In advantageous variants, the direction of main longitudinal extent of the wiper blade is disposed so as to be at least largely parallel to the wiper arm direction. The cover element has a wind deflector face 28. The wind deflector face has a wind deflector face periphery 30. The wind deflector face periphery 30 in the exemplary embodiment shown is configured as a pentagon.

Figure 2:
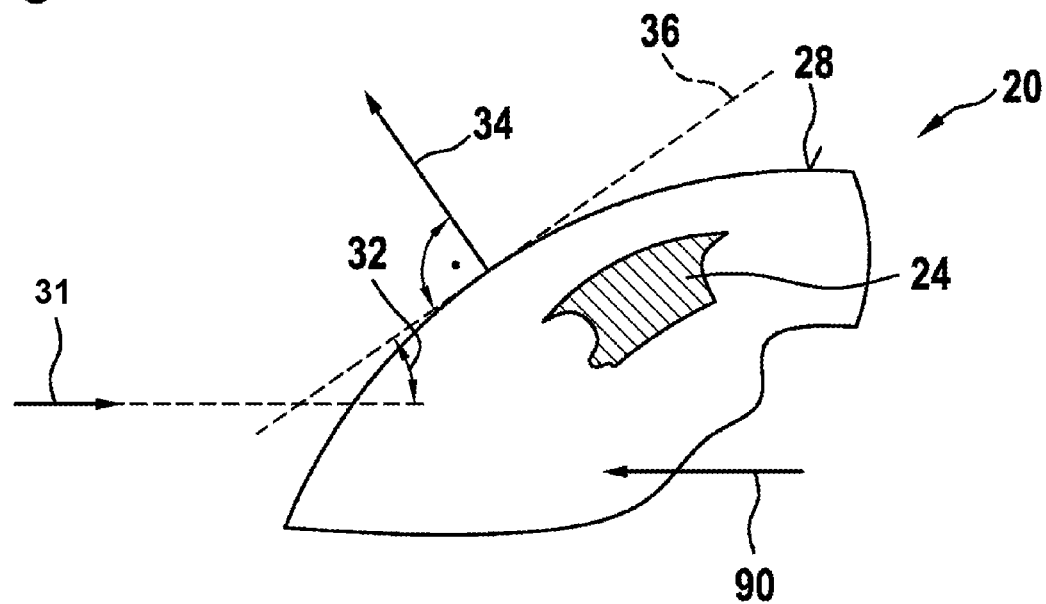
FIG. 2 shows a section through the adapter unit.

FIG. 2 shows a lateral view of the cover element in the wiper arm direction 26. FIG. 2 is a section along the line (see FIG. 1). The image plane of FIG. 2 is disposed so as to be perpendicular to the wiper arm direction 26. The wind deflector face 28 and a direction of an incident flow of wind [[30]]31 enclose the main angle 32 of 35°. The main angle is defined between the direction of an incident wind flow and a tangential plane of a mean normal vector 34 of the wind deflector face. The tangential plane lies so as to be perpendicular to the image plane of FIG. 2, or parallel to the wiper arm direction 26, respectively, and in FIG. 2 is represented by an intersection line 36 of the tangential plane with the image plane. The wind deflector face 28 is configured so as to be convex along the direction of an incident wind flow.

In variants of the adapter unit, the wind deflector face is at least in regions configured so as to be convex, in particular convex along the direction of an incident wind flow. A face of the adapter unit being configured so as to be convex is in particular to be understood such that the face curves out of the adapter unit. In further variants of the adapter unit, the wind deflector face is at least in regions configured so as to be concave, in particular concave along the direction of an incident wind flow. A face of the adapter unit being configured so as to be concave is in particular to be understood such that the face curves into the adapter unit.

Figure 3:
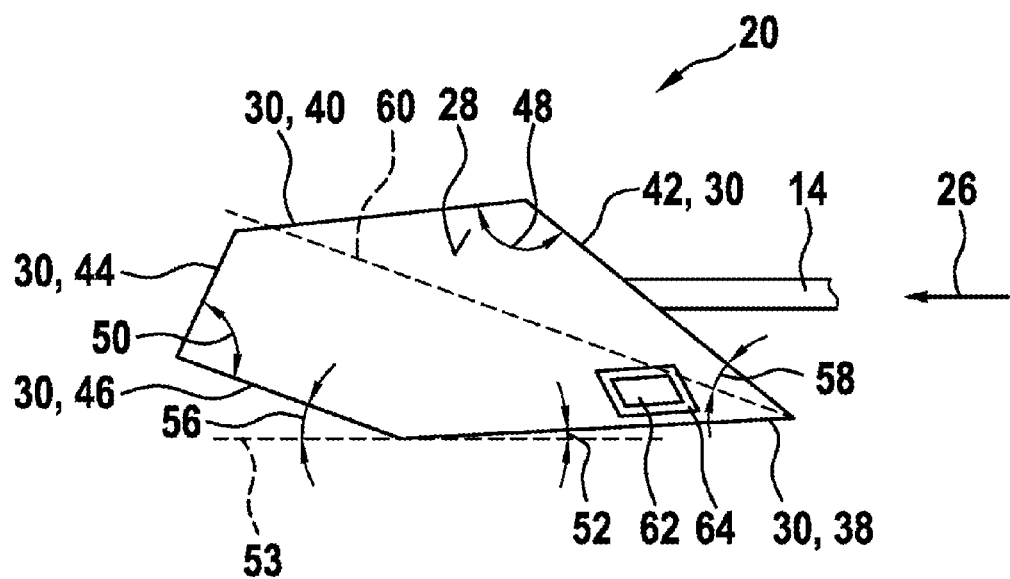
FIGS. 3 and 4 show front views of the adapter unit.

FIG. 3 shows a front view of the cover element 20. The image plane of FIG. 3 is disposed so as to be perpendicular to the mean normal vector 34 (see FIG. 2). The wind deflector face periphery 30 has a side 38 facing the wind. The wind deflector face periphery 30 has a side 40 facing away from the wind. The wind deflector face periphery 30 has a right side 42. The wind deflector face periphery 30 has a rear left side 44. The wind deflector face periphery 30 has a front left side 46.

The side facing away from the wind and the right side define a rear angle 48 of 135°. The rear angle 48 lies within the wind deflector face 28.

The rear left side and the front left side define a left-hand angle 50 of 85°. The left-hand angle 50 lies within the wind deflector face 28.

The side facing the wind in relation to the side facing away from the wind is disposed at a front right-hand angle 52 of 3.0°. The front right-hand angle 52 lies outside the wind deflector face 28. The front right-hand angle 52 is defined between an imaginary first auxiliary straight line 53 and the side facing the wind. The first auxiliary straight line is disposed so as to be parallel to the side facing away from the wind.

The front left side in relation to the side facing away from the wind is disposed at a front left-hand angle 56 of 20°. The front left-hand angle 56 lies outside the wind deflector face 28. The front left-hand angle 56 is defined between the first auxiliary straight line 53 and the front left side.

The front left side in relation to the right side is disposed at an internal angle 58 of 28°. The internal angle 58 lies within the wind deflector face 28. The internal angle 58 is defined between an imaginary second auxiliary straight line 60 and the right side. The second auxiliary straight line 60 is disposed so as to be parallel to the front left side.

Figure 4:
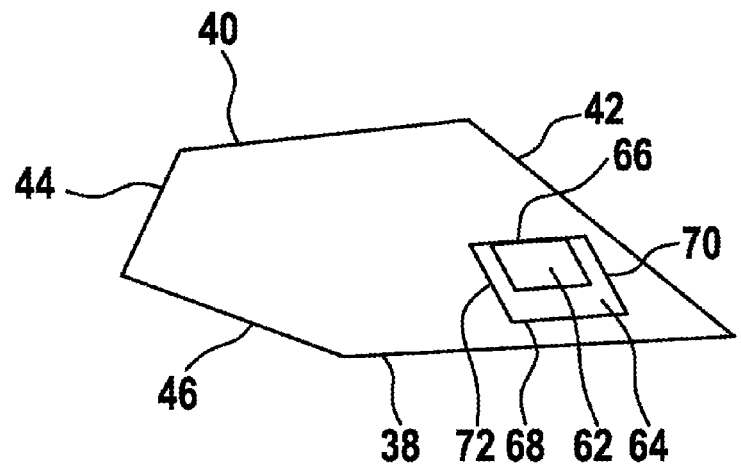

In the exemplary embodiment the wind deflector face 28 has a button 62. The button is configured as a latching button and in the case of a wiper arm assembled or latched, respectively, in the adapter unit is disposed so as to be largely centric in a button opening 64 (see FIG. 3). FIG. 4 shows the adapter unit in which the wiper arm is not latched. The button bears on an upper edge 66 of the button opening.

In the exemplary embodiment the upper edge 66 of the button opening is oriented so as to be parallel to the side 38 facing the wind. In variants, the upper edge 66 of the button opening is oriented so as to be largely parallel to the side 38 facing the wind. A lower edge 68 of the button opening that is opposite the upper edge 66 in the exemplary embodiment is oriented so as to be parallel to the side 38 facing the wind. In variants, the lower edge 68 is oriented so as to be largely parallel to the side 38 facing the wind.

A right edge 70 of the button opening in the exemplary embodiment is oriented so as to be parallel to the right side 42. In variants, the right edge 70 is oriented so as to be largely parallel to the right side 42. A left edge 72 of the button opening that is opposite the right edge 70 in the exemplary embodiment is oriented so as to be parallel to the right side 42. In variants, the left edge 72 is oriented so as to be largely parallel to the right side 42.

Figure 5:
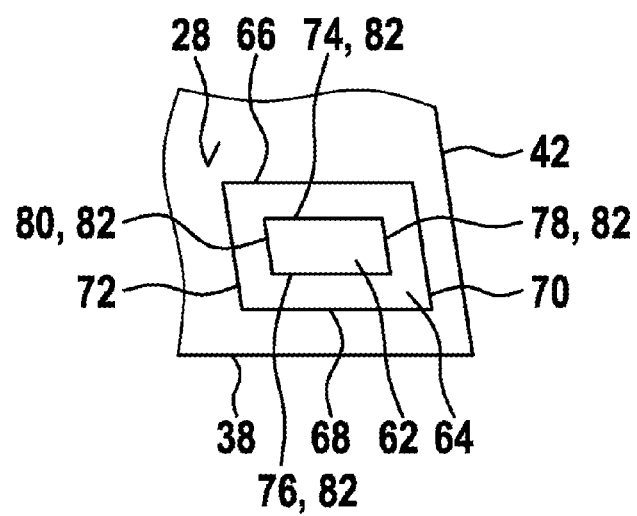
FIGS. 5 and 6 show details of the adapter unit.

FIG. 5 shows a detailed view of the button opening 64 having the button 62. In the exemplary embodiment an upper lateral edge 74 of the button 62 is disposed so as to be parallel to the upper edge 66. The upper lateral edge 74 is disposed so as to be parallel to the side 38 facing the wind. In variants, the upper lateral edge 74 is disposed so as to be largely parallel to the upper edge 66. In variants, the upper lateral edge 74 is disposed so as to be largely parallel to the side 38 facing the wind.

In the exemplary embodiment a lower lateral edge 76 of the button 62 is disposed so as to be parallel to the lower edge 68. The lower lateral edge 76 is disposed so as to be parallel to the side 38 facing the wind. In variants, the lower lateral edge 76 is disposed so as to be largely parallel to the lower edge 68. In variants, the upper lateral edge 76 is disposed so as to be largely parallel to the side 38 facing the wind.

In the exemplary embodiment a right lateral edge 78 of the button 62 is disposed so as to be parallel to the right edge 70. The right lateral edge 78 is disposed so as to be parallel to the right side 42. In variants, the right lateral edge 78 is disposed so as to be largely parallel to the right edge 70. In variants, the right lateral edge 78 is disposed so as to be largely parallel to the right side 42.

In the exemplary embodiment a left lateral edge 80 of the button 62 is disposed so as to be parallel to the left edge 72. The left lateral edge 80 is disposed so as to be parallel to the right side 42. In variants, the left lateral edge 80 is disposed so as to be largely parallel to the left edge 72. In variants, the left lateral edge 80 is disposed so as to be largely parallel to the right side 42.

The upper lateral edge 74, the lower lateral edge 76, the right lateral edge 78, and the left lateral edge 80 form a button contour 82 of the button 62. A button contour is a border of the button. The right lateral edge 78 and the left lateral edge 80 are two opposite lateral edges of the button contour 82 of the button.

Figure 6:
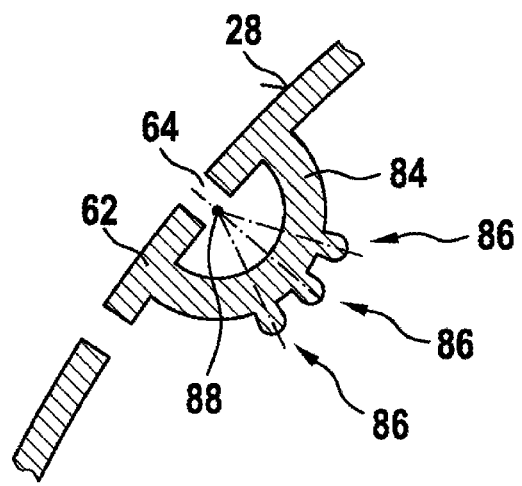

A lateral view of the button 62 viewed from the wiper arm direction 26 is depicted in FIG. 6. The drawing plane of FIG. 6 lies so as to be perpendicular to the wiper arm direction 26. FIG. 6 is a section through the button as per the line VI-VI (see FIG. 1). The button 62 has a spring which is configured as an arcuate piece 84. The arcuate piece has three ribs 86. The ribs 86 are in each case oriented so as to be radial to an arcuate piece center 88. The ribs 86 are in each case disposed on an external periphery of the arcuate piece.

In the exemplary embodiment the cover element 20 is fixedly connectable to the base element 22 by way of a latching connection which is not shown. The base element 22 has a wiper arm receptacle which is not shown. The wiper arm receptacle is configured for coupling to the wiper arm such that the wiper arm is pivotable or rotatable, respectively, about a mounting axis 90 (see FIG. 2). The mounting axis 90 in the exemplary embodiment is oriented so as to be parallel to the direction of an incident wind flow 31. The base element 22 is configured for receiving the wiper blade by way of a plug connection which is not shown.

Figure 7:
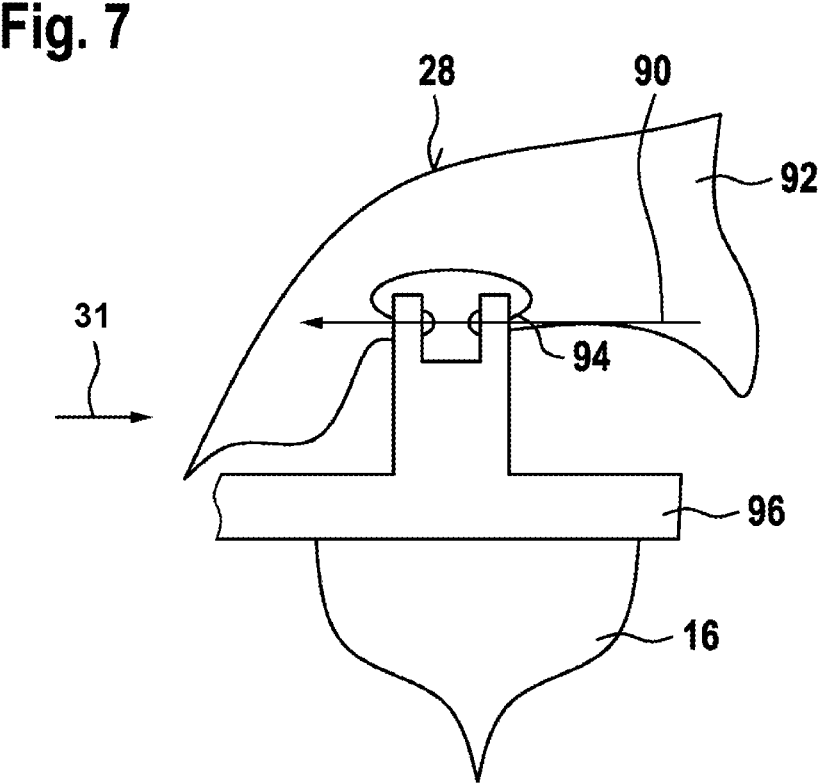
FIG. 7 shows a section through a variant of the adapter unit.

FIG. 7 shows a section through an alternative embodiment of the adapter unit, perpendicular to the wiper arm direction 26. The adapter unit 12 has a wiper arm adapter unit 92. The wiper arm adapter unit has the wind deflector face 28. The wiper arm adapter unit has a wiper arm opening which is not shown and which is configured for receiving the wiper arm. The wiper arm opening is an opening for a receptacle duct into which the wiper arm can be introduced. The receptacle duct runs so as to be largely parallel to the wiper arm direction. The wiper arm adapter unit in the exemplary embodiment has the button as a fixing means which is provided for releasably coupling the wiper arm to the wiper arm adapter unit. The wiper arm adapter unit 92 has a wiper blade adapter unit receptacle 94 which is provided for receiving a wiper blade adapter unit 96 so as to be pivotable about the mounting axis 90. The wiper blade adapter unit 96 is configured and provided for receiving the wiper blade 16.

In advantageous embodiments, the wind deflector face 28 has a modified, or particular, respectively, surface structure. The surface can at least in regions be roughened and/or have a shark skin structure and/or have a golf ball structure. Such a surface structure influences the airflow flowing across said surface structure. The aerodynamic properties of the wind deflector face can be improved in this way. By selecting the type and arrangement of the modified surface structure it is in particular possible to precisely set contact pressing forces acting by way of the wind deflector face.

What is claimed is:

1. An adapter unit which is configured to couple a wiper blade to a wiper arm, the adapter unit having a wind deflector face which is configured for deflecting an incident flow of air and for pressing the wiper blade onto a vehicle glass, wherein the wind deflector face is bordered by a wind deflector face periphery, and the wind deflector face periphery has at least
   a side configured to face a wind, the side configured to face the wind extending largely in a wiper arm direction,
   a side configured to face away from the wind, the side configured to face away from the wind extending largely in the wiper arm direction,
   a right side which is disposed between the side configured to face the wind and the side configured to face away from the wind and is disposed on a wiper arm side of the adapter on which the adapter unit is configured to be coupled to the wiper arm,
   a rear left side which is adjacent to the side configured to face away from the wind and is disposed on a side of the adapter that is opposite the wiper arm side of the adapter, and
   a front left side which is adjacent to the side configured to face the wind and is disposed on the side of the adapter that is opposite the wiper arm side of the adapter, characterized in that the side configured to face away from the wind and the right side define a rear angle between 110° and 160°, wherein the wind deflector face has a button which is configured for releasably coupling the wiper arm to the adapter unit, wherein the button is configured as a latching button which is disposed in a button opening, wherein the latching button is configured such that the latching button is disposed so as to be centric or largely centric in the button opening when the wiper arm is latched, and in that the latching button bears on an upper edge of the button opening when the wiper arm is not latched.

2. The adapter unit as claimed in claim 1, characterized in that the rear left side and the front left side define a left-hand angle between 70° and 120°.

3. The adapter unit as claimed in claim 1, characterized in that the side configured to face the wind in relation to the side configured to face away from the wind is disposed at a front right-hand angle between 0.0° and 20.0°.

4. The adapter unit as claimed in claim 1, characterized in that the front left side in relation to the side configured to face away from the wind is disposed at a front left-hand angle between 10° and 60°.

5. The adapter unit as claimed in claim 1, characterized in that the front left side in relation to the right side is disposed at an internal angle between 0° and 50°, the side configured to face the wind extending between 10° and 40°.

6. The adapter unit as claimed in claim 1, characterized in that the wind deflector face has a rectangular push button which is configured for releasably coupling the wiper arm to the adapter unit, wherein two opposite lateral edges of a button contour of the button are oriented so as to be parallel or largely parallel to the right side.

7. The adapter unit as claimed in claim 1, characterized in that the wind deflector face has a button which is configured for releasably coupling the wiper arm to the adapter unit, wherein the button is configured as a spring button having a spring for applying a restoring force, wherein the spring has an arcuate piece having at least one rib, wherein the at least one rib is oriented so as to be parallel or largely parallel to a radius of the arcuate piece and is provided for reinforcing the arcuate piece.

8. The adapter unit as claimed in claim 1, characterized in that the adapter unit is configured for connecting the wiper arm to the wiper blade so as to be pivotable about a mounting axis.

9. The adapter unit as claimed in claim 8, comprising a wiper arm adapter unit and a wiper blade adapter unit, wherein the wiper arm adapter unit is configured for coupling to the wiper arm, and the wiper blade adapter unit is configured for receiving the wiper blade, wherein the wiper arm adapter unit has a wiper blade adapter unit receptacle which is configured for receiving the wiper blade adapter unit so as to be pivotable about the mounting axis.

10. The adapter unit as claimed in claim 9, characterized in that wiper arm adapter unit includes the wind deflector face.

11. The adapter unit as claimed in claim 8, comprising a base element, a cover element, and a wiper arm receptacle which is configured for receiving the wiper arm so as to be pivotable about the mounting axis, wherein the cover element is configured so as to be connectable to the base element and largely covers the wiper arm receptacle, and wherein the cover element has the wind deflector face, and wherein the base element is configured for receiving the wiper blade.

12. The adapter unit as claimed in claim 11, wherein the cover element is configured so as to be fixedly connectable to the base element such that the cover element connected to the base element is largely immovable in relation to the base element.

13. The adapter unit as claimed in claim 1, characterized in that the adapter unit is configured to releasably couple the wiper blade to the wiper arm.

14. The adapter unit as claimed in claim 1, characterized in that the side configured to face away from the wind and the right side define a rear angle between 120° and 150°.

15. The adapter unit as claimed in claim 1, characterized in that the side configured to face away from the wind and the right side define a rear angle between 130° and 140°.

16. The adapter unit as claimed in claim 1, characterized in that the rear left side and the front left side define a left-hand angle between 80° and 110°.

17. The adapter unit as claimed in claim 1, characterized in that the rear left side and the front left side define a left-hand angle between 90° and 100°.

18. The adapter unit as claimed in claim 1, characterized in that the side configured to face the wind in relation to the side configured to face away from the wind is disposed at a front right-hand angle between 2.5° and 15.0°.

19. The adapter unit as claimed in claim 1, characterized in that the side configured to face the wind in relation to the side configured to face away from the wind is disposed at a front right-hand angle between 5.0° and 10.0°.

20. The adapter unit as claimed in claim 1, characterized in that the front left side in relation to the side configured to face away from the wind is disposed at a front left-hand angle between 20° and 50°.

21. The adapter unit as claimed in claim 1, characterized in that the front left side in relation to the side configured to face away from the wind is disposed at a front left-hand angle between 20° and 50°.

22. The adapter unit as claimed in claim 1, characterized in that the front left side in relation to the right side is disposed at an internal angle between 0° and 50°, the side configured to face the wind extending between 20° and 30°.

23. The adapter unit as claimed in claim 1, characterized in that the wind deflector face has a button which is configured for releasably coupling the wiper arm to the adapter unit, wherein the button is configured as a spring button having a spring for applying a restoring force, wherein the spring has an arcuate piece having three ribs oriented so as to be parallel or largely parallel to a radius of the arcuate piece, the ribs being configure for reinforcing the arcuate piece.

24. An adapter unit which is configured to couple a wiper blade to a wiper arm, the adapter unit having a wind deflector face which is configured for deflecting an incident flow of air and for pressing the wiper blade onto a vehicle glass, wherein the wind deflector face is bordered by a wind deflector face periphery, and the wind deflector face periphery has at least a side configured to face a wind, the side configured to face the wind extending largely in a wiper arm direction, a side configured to face away from the wind, the side configured to face away from the wind extending largely in the wiper arm direction, a right side which is disposed between the side configured to face the wind and the side configured to face away from the wind and is disposed on a wiper arm side of the adapter on which the adapter unit is configured to be coupled to the wiper arm, a rear left side which is adjacent to the side configured to face away from the wind and is disposed on a side of the adapter that is opposite the wiper arm side of the adapter, and a front left side which is adjacent to the side configured to face the wind and is disposed on the side of the adapter that is opposite the wiper arm side of the adapter, characterized in that the side configured to face away from the wind and the right side define a rear angle between 110° and 160°, wherein the wind deflector face has a button which is configured for releasably coupling the wiper arm to the adapter unit, wherein the button is configured as a spring button having a spring for applying a restoring force, wherein the spring has an arcuate piece having at least one rib, wherein the at least one rib is oriented so as to be parallel or largely parallel to a radius of the arcuate piece and is provided for reinforcing the arcuate piece.

\* \* \* \* \*